April 21, 1970  A. A. KNAPP  3,507,566

CONTACT LENS AND SPECTACLE LENS STRUCTURE

Original Filed March 25, 1964

INVENTOR.
ARTHUR A. KNAPP

BY
*Diggins, O'Boyle & Harmon*

ATTORNEY

United States Patent Office 3,507,566
Patented Apr. 21, 1970

3,507,566
CONTACT LENS AND SPECTACLE
LENS STRUCTURE
Arthur A. Knapp, 170 Maple Ave.,
White Plains, N.Y. 10601
Original application Mar. 25, 1964, Ser. No. 354,661.
Divided and this application Apr. 29, 1968, Ser.
No. 730,975
Int. Cl. G02c 7/04, 7/16
U.S. Cl. 351—160                    3 Claims

ABSTRACT OF THE DISCLOSURE

The lens structure includes a tinted lens body to permit the passage of visible light and an opaque covering on the surface of the lens body adjacent the wearer's eye, which covering has a plurality of approximately 1 mm. diameter holes that extend only partially through the lens body without interrupting the front surface. The bottom faces of the holes are substantially parallel to the front surface of the lens.

---

This application is a division of application Ser. No. 354,661, filed Mar. 25, 1964, now abandoned.

BACKGROUND OF THE INVENTION

Lenses are known which render the lens partially opaque or completely opaque so as to black out all or nearly all of the light rays directed at the lens. Also known are lenses wherein the surface is a mirror surface as viewed by one observing the wearer or may be of a tinted glass, plastic or metal. In any case, the lens surface facing the wearer's eye is opaque or partially opaque. In the prior art, the sunglass lenses have generally been utilized as non-prescription lenses such that the user does not receive the benefit of any optical correction. In some instances, however, tinted glass or plastic has been utilized in prescription ground lenses. All types of sunglasses, utilized today, by their very coloring, reduce vision. The present invention improves vision in the sun. And the field of vision to either side is more than sufficient to drive an automobile safely anywhere.

SUMMARY OF THE INVENTION

The present invention contemplates the utilization of a non-prescription lens of the tinted or opaque type while at the same time providing an optical correction or advantage to the wearer, thus giving him improved vision.

The concepts of the present invention depend upon a novel utilization of the phenomenon which occurs when a pinhole or otherwise completely transparent tiny area is provided in a tinted or opaque lens or a tinted lens having opaque backing with the pinhole or transparent area being strategically located with respect to the pupil of the wearer's eye so as to permit the central pencils of light to come into the eye. As utilized in this specification, the terms pinhole refers to a hole having a diameter of approximately 1 mm., more or less. By this method the the peripheral pencils of light or aberrant rays which ordinarily give rise to blurred vision because of their aberration are blocked from entering the eye.

This invention has, therefore, a primary object of presenting an optical lens which provides the wearer with the normal advantages and appearance of sunglasses or eyeshields while at the same time providing optical correction without the necessity of prescription grinding.

A further object of the present invention is to provide a tinted or opaque or partially opaque lens having a plurality of small pinholes or transparent areas located opposite the pupil of the wearer's eye which will not require adjustment with respect to the wearer's eye.

A further object of the present invention is to provide an optical lens of the type under consideration which may be adapted for use with either contact lenses or with ordinary spectacle lenses.

A further and more specific object of the present invention is to provide a contact lens of the type under consideration which has a plurality of pinholes in the center portion thereof for the purpose of improving the wearer's vision and for allowing for the entrance and exit of air to the eye and also a free flow of lacrimal fluid.

The means by which the foregoing objects and other advantages, which will be apparent to those skilled in the art, are accomplished are set forth in the following specification and claims and are illustrated in the accompanying drawings dealing with the various forms of the present invention.

BRIEF DESCRIPTION OF THE DRAWING

Reference is now made to the accompanying drawings in which.

DETAILED DESCRIPTION OF THE DRAWING

Figure 1:
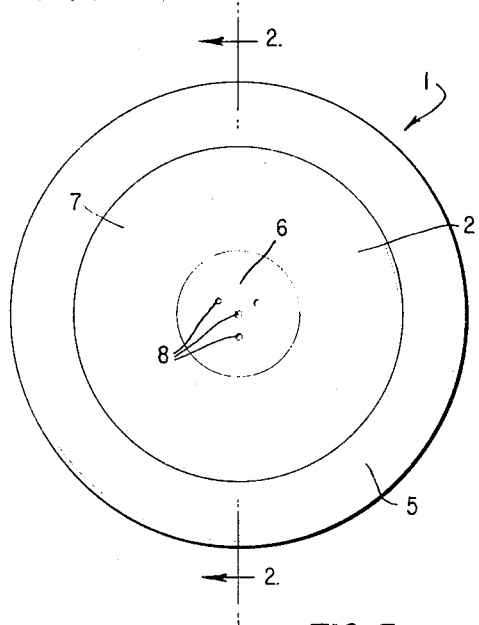
FIGURE 1 is an elevational front view of a contact lens incorporating a preferred structural embodiment of this invention.

Referring now to the drawing, wherein like reference numerals are used to indicate identical parts in the various views, the preferred embodiment of the present invention comprises a contact lens indicated generally at 1 which may be of any desired designed configuration such as the lens shown. It will be understood that the exact contours of the contact lens member may be of any design and the exact configuration of the lens shape forms no part of the present invention. The scleral type of contact lens illustrated in FIGURES 1 and 2 has been chosen merely for the purpose of illustration, and it will be understood that the present invention has equal application to corneal contact lenses.

Figure 2:
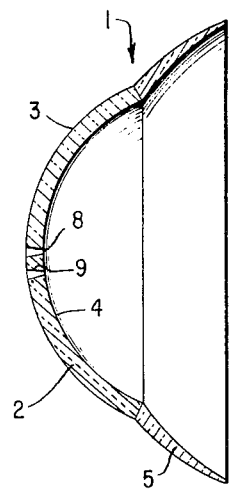
FIGURE 2 is a cross-section of the contact lens shown in FIGURE 1 taken along lines 2—2 of FIGURE 1.

The conventional scleral contact lens member 1 has a corneal section or segment 2 having an outer curved spherical surface 3 and a corresponding inner spherical surface 4 as illustrated in cross-section of FIGURE 2. The exact curvature of the corneal section 2 forms no part of the present invention and may differ in various types of contact lenses. In actual practice, the corneal section 2 may be formed so as to be the approximate size of the cornea of the human eye, or in some cases, may be designed so as to be larged or smaller in area for appearance and comfort reasons.

Around the outside periphery of the corneal section 2, a scleral rim 5 is formed which has the function of providing a transitional peripheral fringe from the corneal section to the natural curvature of the sclera of the human eye. As shown most clearly in FIGURE 2, the section 5 has a tapered cross-section so as to eliminate any abrupt edges which would irritate the eye. The structure thus far described, is well known in the art and further explanation as to the shape of the lens is felt to be unnecessary for the understanding of the present invention to those skilled in the optical arts.

Referring now to the details of the corneal section 2, a central circular position 6, as illustrated in FIGURE 1, is located so as to be positioned directly, or as closely as possible, in front of the pupil portion of the wearer's eye. The portion 6, which will be referred to as the pupil portion of the lens, is colored black or tinted any dark color so as to be either partially or completely opaque to any light source. The area defined by the pupil portion 6 of the lens may be the approximate size of the pupil of the human eye or smaller. If desired, the portion 6 may also be made larger than the human pupil so as to give added beauty to the appearance of the eye. The surrounding and remaining area of the corneal section 2 comprises what will be termed the iris portion of the corneal section as designated by the numeral 7 in FIGURE 1. Both the iris portion 7 of the lens and the scleral rim 5 may be formed from a transparent plastic or glass so as to reveal the natural color of the wearer's eye. In the alternative, the area 7 may be so colored to simulate the desired color of iris, such, as blue, brown or any other color. It is to be understood that the method of providing the coloring to the corneal section of the lens as well as the choice of the precise material utilized in constructing the lens, such as glass or plastic, may be accomplished by any one of a multitude of accepted methods known to those skilled in the art. The choice of coloring and design may also be left up to the individual wearer.

The optical correction obtained from the lens of the present invention is made possible by the placement of a plurality of tiny pinholes 8 located within the black field provided by the pupil portion 6 of the corneal section of the lens. It is also within the scope of the present invention to utilize a single centrally located pinhole within the pupil portion 6, if desired. As clearly shown in FIGURE 2, the pinholes 8 of the preferred embodiment extend completely through the body of the lens and are tapered inwardly so that the larger diameter opening is on the outer surface of the pupil portion 6 and the smaller diameter opening is located on the inner surface 4 of the pupil portion. Although the tapered hole is shown as the preferred construction, a uniform diameter hole or even a hole reversely tapered from that shown would be within the scope of the present invention. In constructing the lens, and providing the coloring for the pupil portion 6, it is essential that the internal surface 9 of each of the pinholes 8 be also colored so as to render them opaque to the aberrant rays of light directed toward the lens and the wearer's pupil. With this structure, it will be seen that only the central pencils of light directed toward any of the pinholes 8 will be allowed to come into the eye and to be so refracted as to be focused onto the vital point of the retina which gives good vision.

It is well known that the pupil of each individual human eye will vary in position, even if only minutely, with respect to the remaining eye structure. The success of the present invention depends upon the fact that better vision, especially for those individuals who suffer from any kind of myopia, including hyperopia, can be obtained by making the pupil of the eye smaller. The pinholes utilized in the present invention actually provide an artificially small pupil for the human eye with the surrounding opaque area 6 of the contact lens serving to block out all extraneous rays of light which normally may interfere with excellent or good vision. The optimum conditions for applying the principles of the present invention would be, of course, to precisely center a single pinhole with respect to the pupil of the wearer so that only the central pencils or straight rays of light would enter the pinhole and pupil to fall on the spot of best vision in the eye, called the macular area, within which is the minute fovea centrailis which gives the best vision for the eye. Accordingly, a spectacle frame may be used to position a single pinhole in lenses before each eye since a single pinhole is satisfactory. The present invention also contemplates the use of a plurality of pinholes in the pupil portion of the lens so as to more easily adapt any given contact lens to any individual eye. This structure may provide much better results than a single centrally located pinhole in the pupil portion 6.

Still other and equally important advantages flow from the use of a plurality of pinholes located in the central pupil portion of a contact lens. In the prior art, much difficulty has been encountered in the application of contact lenses dealing with the problem of permitting a free flow of lacrimal fluid, or tears, to the corneal portion of the wearer's eye. If the flow of lacrimal fluid is prevented by the application of a contact lens on the corneal portion of the eye, the wearer may experience an acute irritation of the eyes resulting in an increased flow of the fluid causing a watering of the eyes. It has also been experienced in some instances that tiny air pockets or bubbles may be trapped beneath the contact lens at the time of application of the lens, thus resulting in irritation. With the presence of the tiny pinholes according to applicant's invention, the excess lacrimal fluid will be permitted to flow freely in the corneal region of the eye. The presence of the pinholes will also permit the entrance and exit of air to the eye resulting in a closer approximation of the normal physiological conditions of the eye. Since the contact lens is also held in place on the surface of the eye by means of surface tension of the fluids present on the surface of the eye, the present invention will serve to enhance the adherence of the lens to the eye since the fluids present will be allowed freely to spread across the entire surface of the contact lens and thus increase the surface tension.

Although the present invention has been described primarily as involving the presence of pinholes in the pupil portion of the lens, the same optical effect could be gained by providing tiny areas of completely transparent glass or plastic within a blackened or colored opaque area of the same plastic or glass in the position of the pupil portion 6 illustrated in the drawings. If this type of construction is utilized, however, the advantages gained by the free flow of eye fluids to and from the corneal portion of the eye will not be obtained. It is to be understood, however, that such a construction would be completely within the scope of the present invention.

It will be readily appreciated by those skilled in the art that the present invention as applied to non-prescription contact lenses provides advantages not available in the contact lenses of the prior art. With the present invention, improved vision may be obtained without the expense of prescription ground contact lenses, while at the same time the coloring of the contact lens may be utilized as a beauty aid. The presence of the pinholes or, in the alternative, the presence of tiny areas of transparent material within the pupil portion will not be apparent to the observer of the wearer of the lenses and the coloring and size of both the pupil portions and the iris portions of the contact lens will make the eyes more alluring to those who desire such an effect.

Figure 3:
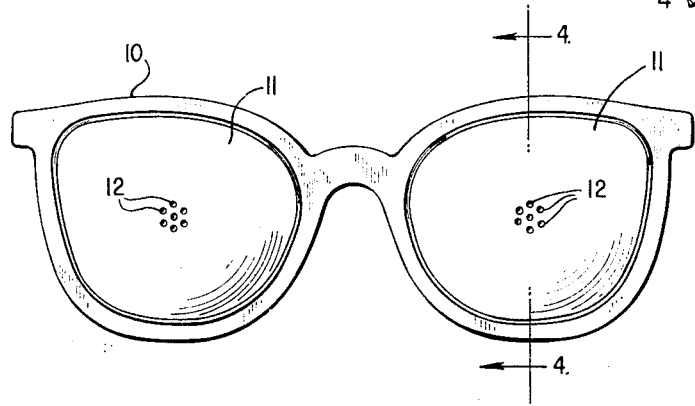
FIGURE 3 is a front elevational view of conventional spectacles provided with the preferred novel lens structure.
Figure 4:
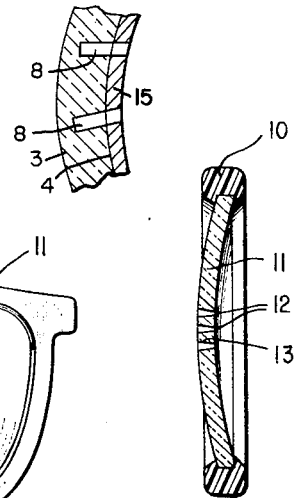
FIGURE 4 is a cross-sectional view of the lens and mounting structure of the spectacles of FIGURE 3 taken along lines 4—4 of FIGURE 3.

In FIGURES 3 and 4, the present invention is illustrated as applied to sunglasses or the like wherein conventional spectacle frames 10 may be fitted with lens members 11 having a plurality of pinholes 12 located in the central portion thereof. As shown clearly in FIGURE 4, the pinholes 12 in the spectacle lenses will have tapered walls 13 with the larger diameter openings on the outer surface of the lens. As explained in connection with FIGURE 2, it is also within the scope of the present invention to construct the holes with a reverse taper or of a uniform diameter. The purpose for providing multiple pinholes in the spectacle lens is substantially the same as that explained in the instance of the contact lenses with the same advantages flowing therefrom. It would, of course, be feasible to provide a single pinhole in the central portion of the lens members 11 in the event that the lenses themselves or the frames 10 included some structure for vertically and horizontally adjusting the position of the lens members with relation to the eyes of the wearer. As previously explained, the ability to provide a pinhole at the optimum point with relation to the pupil of the wearer's eye is extremely important. With the use of the present invention in the lenses of spectacle frames, it would be possible to use a wide range of materials in constructing the lens members since the lens member need not be especially adapted for contact with the human eye. The lens members 11 of the invention may be constructed of glass, plastic, metal, or may be prepared with a plain mirror surface or any closed mirrored surface, or any color, on the side facing the observer of the wearer.

Those individuals who suffer an undesirable psychological effect from the need for optical lenses will gain special advantage from applicant's invention as applied to conventional sunglass lenses. Since the tiny pinholes in an opaque or partially opaque lens are generally not revealed to the observer, the appearance will be that of a sunglass, although the wearer's vision is actually being aided or corrected by the presence of the glasses. This concept applies especially to the myopic person whose vision is reduced slightly or greatly by this physical defect. With the use of the lens of the present invention, the small opening or pinhole in an otherwise opaque lens reduces the disturbing aberrant rays of light by the presence of the artificial pupils or pinhole in front of the eye. When the present concept is applied to the normal tinted lens of conventional sunglasses even the person having perfect vision will be aided by the fact that the troublesome tremendous glare usually experienced in the bright sun or in arctic areas will be eliminated by the apparent sunglass while at the same time the wearer will be able to focus his vision on a particular object which is illuminated by the same brightness and have better vision than he would without a sunglass or any of the present sunglasses.

Figures 5, 6:
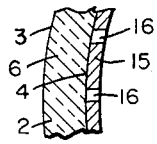
FIGURE 5 is a partial cross-sectional view, also taken on line 2—2 of FIGURE 1, of another embodiment of a lens structure.
FIGURE 6 is a partial cross-sectional view, similar to FIGURE 3 and also taken on line 2—2 of FIGURE 1, of an alternative embodiment of a lens structure.

An alternative embodiment of this invention, which as in the case of the embodiment previously described may also be used in contact lenses or conventional spectacles, is illustrated in FIGURE 5. The shape of the contact lens shown is, of course, exactly similar to that illustrated in FIGURES 1 and 2, but in this embodiment the corneal section or segment 2 is completely uninterrupted by pinholes or transparent portions of glass or plastic extending through a blackened or opaque area. Instead, there is provided a completely uniform and homogeneous central circular portion 6, positioned, as hereinbefore described, in front of the pupil of the wearer's eye, and fully tinted.

The inner surface 4 directly behind and corresponding to portion 6 is covered with an opaque coating, or a layer of opaque coloring 15, the opaque coating or layer having therein one or more small circular areas 16 of a size approximately the same as occur in surface 4 in the embodiment with pinholes. These openings or apertures in the opaque layer will admit only central pencils of light while blocking the entry of aberrant rays into the eye of the wearer with the consequent improvement of vision as hereinbefore discussed. In addition, no pinholes or transparent portions are present and a completely homogeneous appearance in the pupil portion of the wearer's eye is presented to the observer such that the light ray admitting apertures are undetectable.

There is no reduction of vision wearing these sunglasses in the sun, in fact there is improved vision in the sun, which prompts people to wear sunglasses, because the sun cuts down their vision and/or is very disturbing As previously noted, this embodiment may also be provided in conventional spectacles which would then present the appearance of sunglasses. Of course, the opaque surface or layer may, if desired, be positioned immediately behind the front tinted surface 3; that is, it need not be positioned specifically at inner surface 4.

Alternatively, the pinhole structure previously described may be modified as shown in FIGURE 6 such that the pinholes 8 or transparent portions extend from the opaque coating 15 through inner surface 4 and to a point immediately behind front surface 3 whereby the lens presents an uninterrupted appearance of homogeneity. All of these modifications are intended to fall within the scope of this invention.

It will be readily apparent to those skilled in the art that the present invention provides novel and useful improvements in lenses of the type described. Through the medium of the present invention, the advantages of optical correction are available without the necessity of the expense of prescription grinding of lenses. The arrangements and types of structural components utilized in this invention may be subject to numerous modifications well within the preview of this invention and the applicant intends only to be limited to a liberal interpretation of the specification and appended claims.

Having thus described in the invention, what is claimed as new and desired to be secured by Letters Patent is:

I claim:

1. An optical correction lens comprising: a lens body having front and rear surfaces with the rear surface to face the wearer's eye, said lens body comprising a tinted material adapted to permit the passage of visible light, an opaque covering on the rear surface of the lens, a plurality of approximately 1 mm. diameter closely spaced holes extending through said opaque covering substantially before the wearer's pupil, said holes extending only partially through the lens body such that said front surface remains uninterrupted, wherein said holes have bottom faces substantially parallel to and closely adjacent to the front surface of the lens.

2. The lens of claim 1, wherein said lens is formed as a contact lens.

3. The lens of claim 1, wherein said lens is formed as a spectacle lens.

References Cited

UNITED STATES PATENTS

| | | | |
|---|---|---|---|
| 564,518 | 7/1896 | Heilborn | 351—46 |
| 1,959,915 | 5/1934 | Guthrie | 351—46 |
| 1,985,170 | 12/1934 | Jeanneret | 351—53 |
| 2,129,059 | 9/1938 | Feinbloom | 351—162 |

FOREIGN PATENTS

| | | |
|---|---|---|
| 699,736 | 11/1953 | Great Britain. |
| 1,175,944 | 11/1958 | France. |
| 304,872 | 4/1955 | Switzerland. |
| 89,575 | 10/1922 | Austria. |
| 167,273 | 12/1950 | Austria. |
| 189,810 | 5/1957 | Austria. |

DAVID H. RUBIN, Primary Examiner

U.S. Cl. X.R.

2—14; 351—46, 159, 165